United States Patent
Balus et al.

(10) Patent No.: US 8,751,683 B2
(45) Date of Patent: Jun. 10, 2014

(54) FAILURE PROTECTION IN A PROVIDER BACKBONE BRIDGE NETWORK USING SELECTIVE REDIRECTION

(75) Inventors: Florin Balus, Cupertino, CA (US); Kendall William Harvey, Sunnyvale, CA (US); Joe Regan, Pleasanton, CA (US); Paul Kwok, Mountain View, CA (US)

(73) Assignee: Alcatel Lucent, Paris (FR)

( * ) Notice: Subject to any disclaimer, the term of this patent is extended or adjusted under 35 U.S.C. 154(b) by 1281 days.

(21) Appl. No.: 11/972,173

(22) Filed: Jan. 10, 2008

(65) Prior Publication Data

US 2008/0228943 A1 Sep. 18, 2008

Related U.S. Application Data

(60) Provisional application No. 60/894,675, filed on Mar. 13, 2007.

(51) Int. Cl.

| G06F 15/173 | (2006.01) |
| G06F 11/00 | (2006.01) |
| H04L 12/56 | (2006.01) |
| H04L 12/46 | (2006.01) |
| H04L 12/70 | (2013.01) |
| G06F 3/06 | (2006.01) |

(52) U.S. Cl.
CPC ............. *H04L 45/28* (2013.01); *H04L 45/22* (2013.01); *H04L 12/462* (2013.01); *H04L 2012/5627* (2013.01); *H04L 45/66* (2013.01); *G06F 3/0635* (2013.01); *H04L 45/08* (2013.01)
USPC ........... 709/239; 709/223; 370/216; 370/225; 370/242

(58) Field of Classification Search
CPC ....... H04L 45/28; H04L 45/22; H04L 12/462; H04L 2012/5627; H04L 45/66; H04L 45/08; G06F 3/0635
USPC .................................................. 709/239, 223
See application file for complete search history.

(56) References Cited

U.S. PATENT DOCUMENTS

2006/0209682 A1* 9/2006 Filsfils et al. ................. 370/219
2007/0076719 A1* 4/2007 Allan et al. ................... 370/392

OTHER PUBLICATIONS

Pranjal Kumar Dutta et al.; "LDP Extensions for Optimized MAC Address Withdrawal in H-VPLS draft-pdutta-l2vpn-vpls-ldp-mac-opt-02.txt", Mar. 3, 2007, p. 1-12.
Sajassi, et al.; "VPLS Interoperability with Provider Backbone Bridges draft-sajassi-l2vpn-vpls-pbb-interop-00.txt", Mar. 2007, p. 1-20.

* cited by examiner

*Primary Examiner* — Viet Vu
*Assistant Examiner* — Herman Belcher
(74) *Attorney, Agent, or Firm* — Wilson Ham & Holman

(57) ABSTRACT

A technique for operating a network involves controlling the black-holing of traffic by selectively redirecting unicast traffic destined for a dual-homed customer equipment (CE) device from a first provider backbone bridge (PBB) provider edge (PE) device to a second PBB PE device in response to a service failure. Unicast traffic is selectively redirected from the first PBB PE device to the second PBB PE device for a time interval that is long enough to enable the customer source MAC address (CMAC)-to-backbone MAC address (BMAC) association of the second PBB PE device to be learned by other PBB PE devices.

17 Claims, 5 Drawing Sheets

FAILURE PROTECTION IN A PROVIDER BACKBONE BRIDGE NETWORK USING SELECTIVE REDIRECTION

CROSS-REFERENCE TO RELATED APPLICATION

This application is entitled to the benefit of provisional Patent Application Ser. No. 60/894,675, filed 13 Mar. 2007.

FIELD OF THE INVENTION

The invention relates generally to network management, and more particularly, to providing failure protection in a network that utilizes provider backbone bridging (PBB).

BACKGROUND OF THE INVENTION

Provider backbone bridging or provider backbone bridges (PBB) is an Ethernet-based technology that enables the layering of a network into customer and provider domains with complete isolation between customer and provider MAC addresses. This technology is currently being formalized as an IEEE standard identified as IEEE 802.1ah. Provider backbone bridging is implemented between provider edge (PE) devices by adding a provider backbone header that includes a backbone source address (B-SA), a backbone destination address (B-DA), a backbone VLAN ID (B-VID), and a service instance VLAN ID (I-VID). Within a provider backbone bridging domain, packets are forwarded based on media access control (MAC) learning, loop avoidance is accomplished through Spanning Tree Protocol (STP), and B-VIDs are used for broadcast containment.

At the edges of a provider backbone bridging domain (e.g., at the PBB PE devices), forwarding information bases (FIBs) are populated with customer source MAC address (CMAC) and backbone source MAC address (BMAC) associations which are obtained through MAC address learning. In particular, a customer packet with a customer source address that enters the provider backbone bridging domain at a first PBB PE device is mapped to a backbone source MAC address, which is the source MAC address of the PBB PE device at which the packet entered the provider backbone bridging domain.

In order to provide failure protection between customer and provider domains, a customer edge (CE) device may be linked to two different PBB PE devices, a practice referred to as "dual-homing." When a CE device is dual-homed, other PBB PE devices in the PBB domain will learn CMAC-to-BMAC associations for whichever link is being used to send traffic between the CE device and the two PBB PE devices to which the CE device is connected. As long as the link between the PBB PE device and the CE device is active, the learned CMAC-to-BMAC associations at the other PBB PE devices are valid and customer traffic will be successfully switched across the PBB domain to the target CE device.

However, if the link between the active PBB PE device and the target CE device fails or the active PBB PE itself fails, CMAC-to-BMAC associations learned at the other PBB PE devices will cause traffic to be sent to the target CE device via the failed link and/or the failed PBB PE device. Traffic that is sent to the target CE device via the failed link or the failed PBB PE device will not make it to the CE device and will eventually be lost without the knowledge of the sending PBB PE device at the other end of the PBB domain. This loss of traffic, often referred to as "black-holing," will continue until the CMAC-to-BMAC associations are aged out of the FIBs at the respective PBB PE devices or until a new packet is sent from the CE device with the same CMAC such that a new CMAC-to-BMAC association can be learned through the native Ethernet learning process. Relying on aging or the transmission of a new packet to trigger a new CMAC-to-BMAC association may result in noticeable disruptions to the customer, especially with regard to time-sensitive applications such as real-time voice and streaming video.

SUMMARY OF THE INVENTION

A technique for operating a network involves controlling the black-holing of traffic by selectively redirecting unicast traffic destined for a dual-homed CE device from a first PBB PE device to a second PBB PE device in response to a service failure. Unicast traffic is selectively redirected from the first PBB PE device to the second PBB PE device for a time interval that is long enough to enable the CMAC-to-BMAC association of the second PBB PE device to be learned by other PBB PE devices.

A method for operating a network that utilizes provider backbone bridging to create a PBB domain is disclosed. The network includes a first CE device connected to first and second PBB PE devices and a second CE device connected to a third PBB PE device. The method involves creating a backup link between the first and second PBB PE devices, with the backup link identifying customer CMACs for which unicast traffic can be redirected from the first PBB PE device to the second PBB PE device, detecting a service failure that requires a path change for customer traffic to reach the first CE device from the second CE device, and selectively redirecting unicast traffic, which is destined to the first CE device, from the first PBB PE device to the second PBB PE device in response to the detected service failure. Selectively redirecting the unicast traffic to the second PBB PE device enables the traffic to reach the first CE device and because only unicast traffic is redirected to the second PBB PE device, loops that would otherwise be created by redirecting multicast or broadcast traffic are avoided.

In another embodiment, a network device is disclosed. The network device is used in a network that utilizes PBB to create a PBB domain, wherein the network includes a first CE device connected to first and second PBB PE devices and a second CE device connected to a third PBB PE device. The network device is configured to create a backup link between the first and second PBB PE devices, the backup link identifying CMACs for which unicast traffic can be redirected from the first PBB PE device to the second PBB PE device, detect a service failure that requires a path change for customer traffic to reach the first CE device from the second CE device, and to selectively redirect unicast traffic, which is destined to the first CE device, from the first PBB PE device to the second PBB PE device via the backup link in response to the detected service failure.

Other aspects and advantages of the present invention will become apparent from the following detailed description, taken in conjunction with the accompanying drawings, illustrating by way of example the principles of the invention.

BRIEF DESCRIPTION OF THE DRAWINGS

Throughout the description, similar reference numbers may be used to identify similar elements.

DETAILED DESCRIPTION

Provider backbone bridging or provider backbone bridges, both referred to herein as "PBB," can be applied to various different network topologies. One topology that is employed by service providers involves using multiprotocol label switching (MPLS) from end-to-end within a PBB domain. Another topology employed by service providers involves utilizing provider backbone bridging in the metropolitan area network (MAN) and MPLS in the wide area network (WAN). In both cases, provider backbone bridging enables customer MAC addresses (CMACs) to be hidden from the service provider domain while backbone MAC addresses (BMACs) are used to forward traffic within the PBB domain. In order to translate between CMACs and BMACs, CMAC-to-BMAC learning occurs at the edges of the PBB domain, i.e., at PBB PE devices, and corresponding FIBs are populated with the learned CMAC-to-BMAC associations. When customer traffic is sent through the PBB domain, CMAC-to-BMAC translations are performed at the interface between the customer and service provider domains using the FIBs that are populated with the CMAC-to-BMAC associations.

Dual-homing is often used to provide failure protection between the customer and provider domains. In a dual-homed configuration, a customer edge (CE) device is linked to two different PBB PE devices and the dual-homing can lead to the black-holing of traffic when the link between the primary PBB PE device and the CE device fails or when the primary PBB PE device itself fails. In accordance with an embodiment of the invention, the black-holing of traffic is controlled by selectively redirecting unicast traffic from the PBB PE device identified through the CMAC-to-BMAC associations to the secondary PBB PE device to which the dual-homed CE device is connected.

Figure 1A:
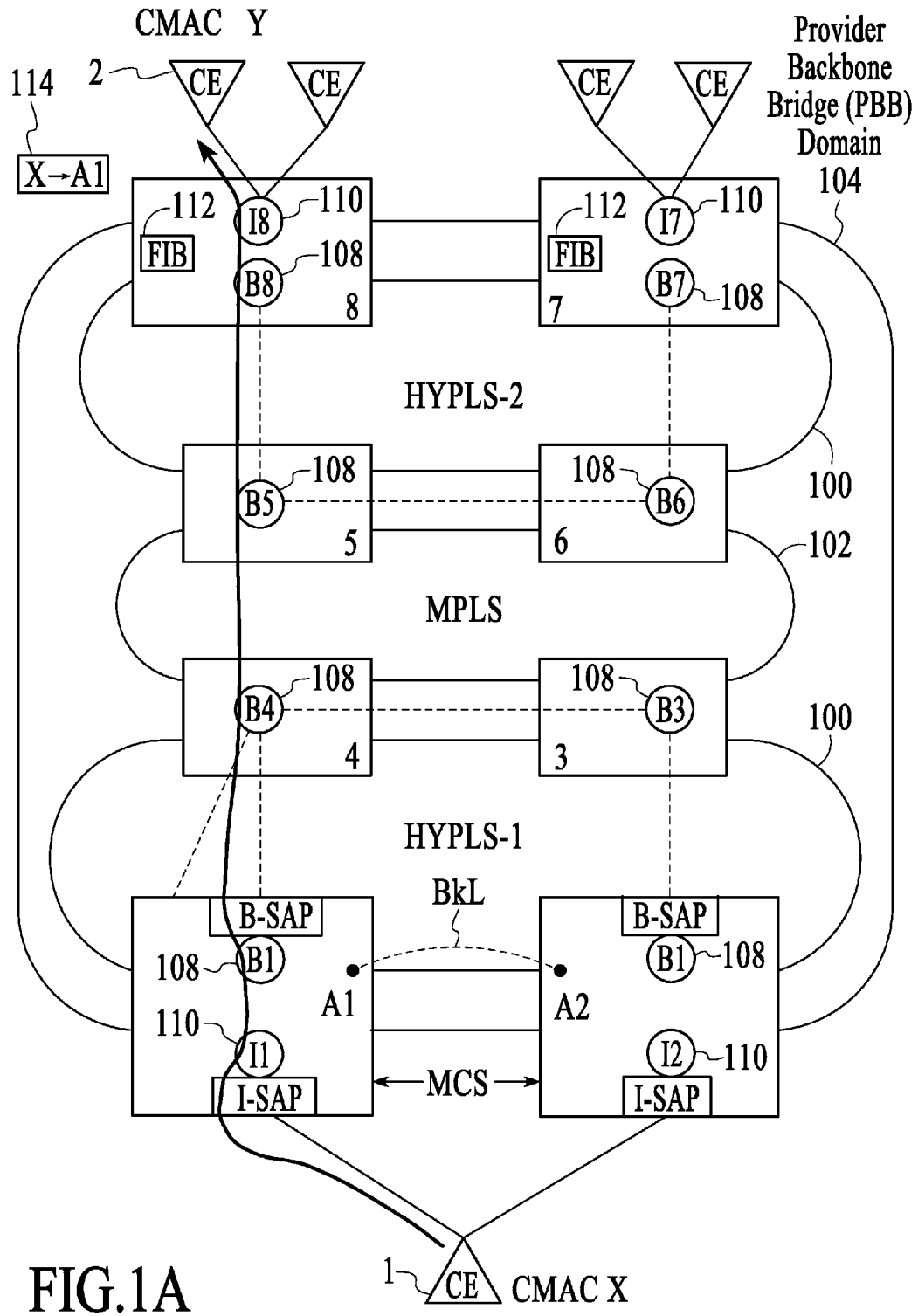
FIGS. 1A-1C illustrate a technique for controlling black-holing that is applicable to a network topology in which CE devices are connected by HVPLS in the MAN and by MPLS in the WAN and to a network topology in which CE devices are connected by PBB in the MAN and by MPLS in the WAN.

FIG. 1A depicts a network topology in which CE devices are connected by Hierarchical Virtual Private LAN Services (HVPLS) in the MAN 100 and by MPLS in the WAN 102. PBB is run within the HVPLS and MPLS domains to create a PBB domain 104 that isolates the CMACs from any devices that are within the core of the PBB domain. In FIG. 1A, only PE devices are shown. In particular, HVPLS domain 1 includes PE devices A1, A2, 3, and 4, the MPLS domain includes PE devices 3, 4, 5, and 6, and HVPLS domain 2 includes PE devices 5, 6, 7, and 8. Although devices A1-8 are all PE devices with respect to their corresponding MAN and/or WAN, only PE devices A1, A2, 7, and 8 are PE devices with respect to the PBB domain. PE devices that are edge devices with respect to the PBB domain are referred to herein as "PBB PE devices." PBB PE devices may also be referred to as Backbone Edge Bridges (BEBs) in the developing IEEE 802.1ah standard, see for example, IEEE P802.1ah Draft 3.4, dated Mar. 10, 2007, which is incorporated by reference herein. The PBB PE devices perform CMAC-to-BMAC learning and populate their FIBs 112 with the learned CMAC-to-BMAC associations. Each PBB PE device includes a backbone component 108 that faces the PBB domain and is backbone MAC address based and a customer component 110 that faces the customer domain and is customer MAC address based. In an embodiment, the customer component and the backbone component of the PE devices are embodied as software objects.

In an exemplary operation, a packet from CE device 1 has a customer source MAC address X and a customer destination MAC address Y. Once the packet travels through the PBB domain to the target CE device, the customer source MAC address is associated with the backbone source MAC address of the device through which the packet entered the PBB domain. This CMAC-to-BMAC association is installed into the FIB at the corresponding PBB PE device. For example, referring to FIG. 1A, if a customer packet travels from CE device 1 to CE device 2 through PBB PE device A1, then PBB PE device 8 learns that customer source MAC address X (CMAC X) is associated with backbone source MAC address A1 (BMAC A1), that is, PBB PE device 8 learns the CMAC-to-BMAC association 114 of X→A1. Once the CMAC-to-BMAC association is learned at PBB PE device 8, all customer traffic from CE device 2 destined for CMAC X is sent through the PBB domain via PBB PE device A1 using BMAC A1 as a destination address. As long as PBB PE device A1 is active and the link between PBB PE A1 and CE device 1 is active, traffic destined to CMAC X from PBB PE device 8 will be successfully delivered to CE device 1 via PBB PE device A1. However, if the link between PBB PE device A1 and CE device 1 fails or PBB PE device A1 itself fails, traffic forwarded from PBB PE device 8 to CE device 1 via PBB PE A1 will likely be black-holed.

Figure 1B:
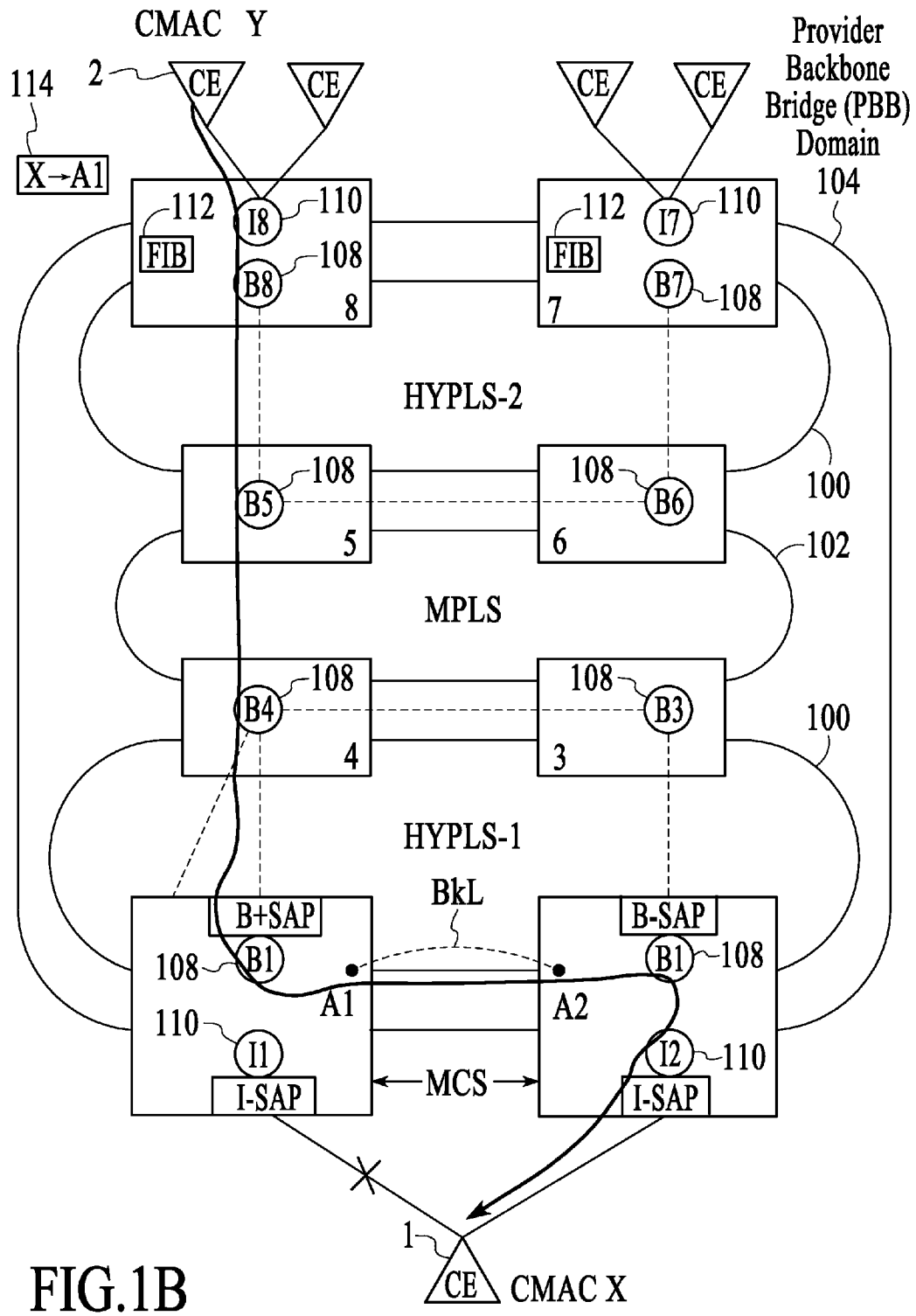
Figure 1C:
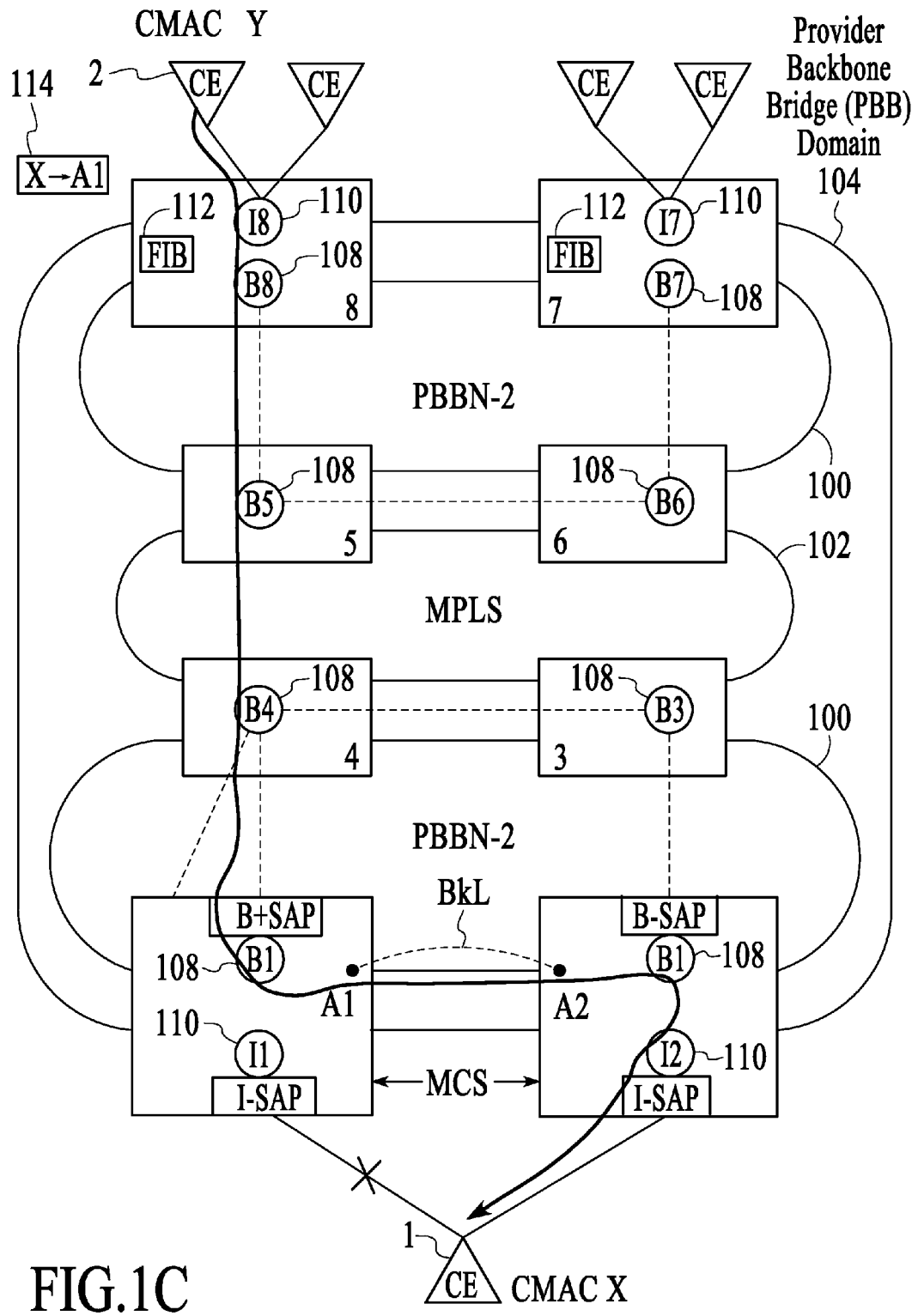

In accordance with an embodiment of the invention, a technique for providing failure protection in a PBB environment that controls black-holing is described with reference to FIGS. 1A-1C. In an embodiment, a backup link is created between the two PBB PE devices to which the CE device is dual-homed (e.g., PBB PE devices A1 and A2). The backup link is used to forward frames to destination CMACs for which unicast traffic can be redirected from the first PBB PE device to the second PBB PE device. These FIB entries for the CMACs associated with the failed link(s) are changed to point to the backup link. The backup link can be configured, for example, as a backbone Service Access Point (B-SAP) or as a backbone Service Distribution Point (B-SDP). FIG. 1A depicts a network topology in which a backup link is instantiated between PBB PE devices A1 and A2. The backup link is used to selectively redirect unicast traffic in the event of a failure of a customer Service Access Point (I-SAP) that is marked as protected. In an embodiment, backup links can be defined on a per-I-SAP, per I-VPLS, or a per B-VPLS basis.

In operation, when the link between CE device 1 and PBB PE device A1 fails, PBB PE device A1 associates existing CMAC associations related to the failed link with BMAC A2 and the backup link, BkL. For example, at PBB PE device A1, CMAC X is associated with BMAC A2 and the backup link, BkL. Traffic received at PBB PE device A1 and destined for CE device 1 is selectively redirected to PBB PE device A2 via the backup link, BkL, in response to the new associations. In particular, only unicast traffic with known CMACs that are associated with BMAC A2 are redirected to PBB PE device A2 via the backup link, BkL. FIG. 1B depicts the redirection of CMAC X traffic from PBB PE device A1 to PBB PE device A2 via the backup link, BkL. Although unicast traffic with known CMAC destination addresses is redirected to PBB PE A2, no broadcast or multicast traffic is redirected to PBB PE device A2 via the backup link. Broadcast and multicast traffic is not redirected to PBB PE device A2 in order to prevent the creation of loops. For example, loops may be created if broadcast or multicast traffic is redirected to PBB PE device A2 and then multicast or broadcast from PBB PE device A2 back into the PBB domain 104.

In an embodiment, at PBB PE device A1, the following rules are applied: only known unicast traffic that matches remapped CMACs is forwarded to PBB PE device A2; no flooded traffic (i.e., traffic using a broadcast or multicast BMAC as the destination MAC address) is forwarded across the backup link to PBB PE device A2; as a security feature, received broadcast packets are discarded; and no relearning of the remapped CMACs occurs until the entries mapped to the backup link age out, except when the received PBB packets are flooded—i.e. the BMAC DA is a broadcast or a multicast address belonging to a local I-SID.

In an embodiment, upon reception of the redirected packets at PBB PE device A2, the following rules are applied: no MAC Learning shall occur; the packets are flooded only in the I-VPLS domain derived from their I-SID; and packets are not forwarded towards the PBB domain (e.g., the B-VPLS domain) to prevent the creation of loops.

In an embodiment, selective redirection of unicast traffic continues for a limited pre-defined time interval. For example, CMAC aging will eventually remove selective redirection entries at PBB PE device A1 as the remote PBB PE devices (e.g., PBB PE device 8) install new entries. In an embodiment, a local aging timer for the entries that support selective redirection is set longer than the aging timer of the remote PBB PE devices. Over time, new CMAC-to-BMAC associations will be learned at the remote PBB PE devices. Once the new CMAC-to-BMAC associations are learned, selective redirection will no longer be needed and the local redirection entries will age out. In this way, selective redirection provides a temporary path to ensure that unicast traffic does not get black-holed before new CMAC-to-BMAC associations are learned.

In an embodiment, selective redirection works with multichassis link aggregation (MC-LAG) and/or multicast VPLS (MVPLS). In an embodiment, the backup link, BkL, is not part of the HVPLS/PBB context. Multichassis synchronization (MCS) may be used as a transport mechanism for synchronization. In an embodiment, the PBB PE devices remap only when the link is active to optimize the usage of the backdoor link, i.e., there is no point in redirecting the frames to the backup PE if that link is not available.

The above described technique is also applicable to the case in which PBB is used in the MAN and MPLS is used in the WAN. FIG. 1C depicts the use of selective redirection as described above with reference to FIGS. 1A and 1B in the case in which CE devices are connected by PBB in the MAN and MPLS in the WAN.

In an embodiment, an SDP is a software object to which one or more service and one or more data transport tunnels may be bound. By binding the services to the SDPs, instead of binding the services directly to the transport tunnels, the services can be configured independently of the transport tunnels, and vice versa, thereby simplifying the provisioning and/or reconfiguration of each.

Figure 2:
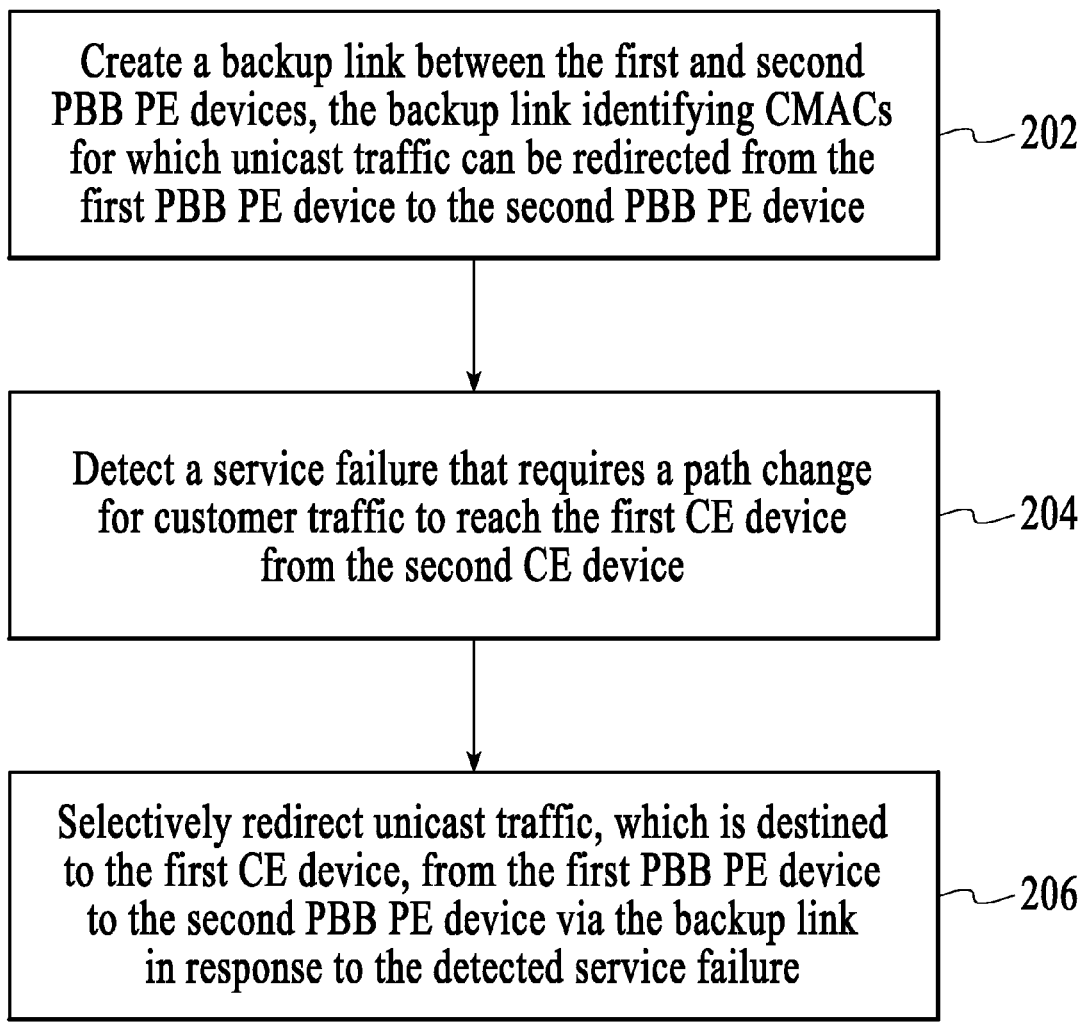
FIG. 2 is a process flow diagram of a method for operating a network in accordance with an embodiment of the invention.

FIG. 2 is a process flow diagram of a method for operating a network in accordance with an embodiment of the invention. In the embodiment of FIG. 2, the network utilizes PBB to create a PBB domain, wherein the network includes a first CE device connected to first and second PBB PE devices and a second CE device connected to a third PBB PE device. According to the method, at block 202, a backup link is created between the first and second PBB PE devices, the backup link identifying CMACs for which unicast traffic can be redirected from the first PBB PE device to the second PBB PE device. At block 204, a service failure that requires a path change for customer traffic to reach the first CE device from the second CE device is detected. At block 206, unicast traffic, which is destined to the first CE device, is selectively redirected from the first PBB PE device to the second PBB PE device via the backup link in response to the detected service failure.

Figure 3:
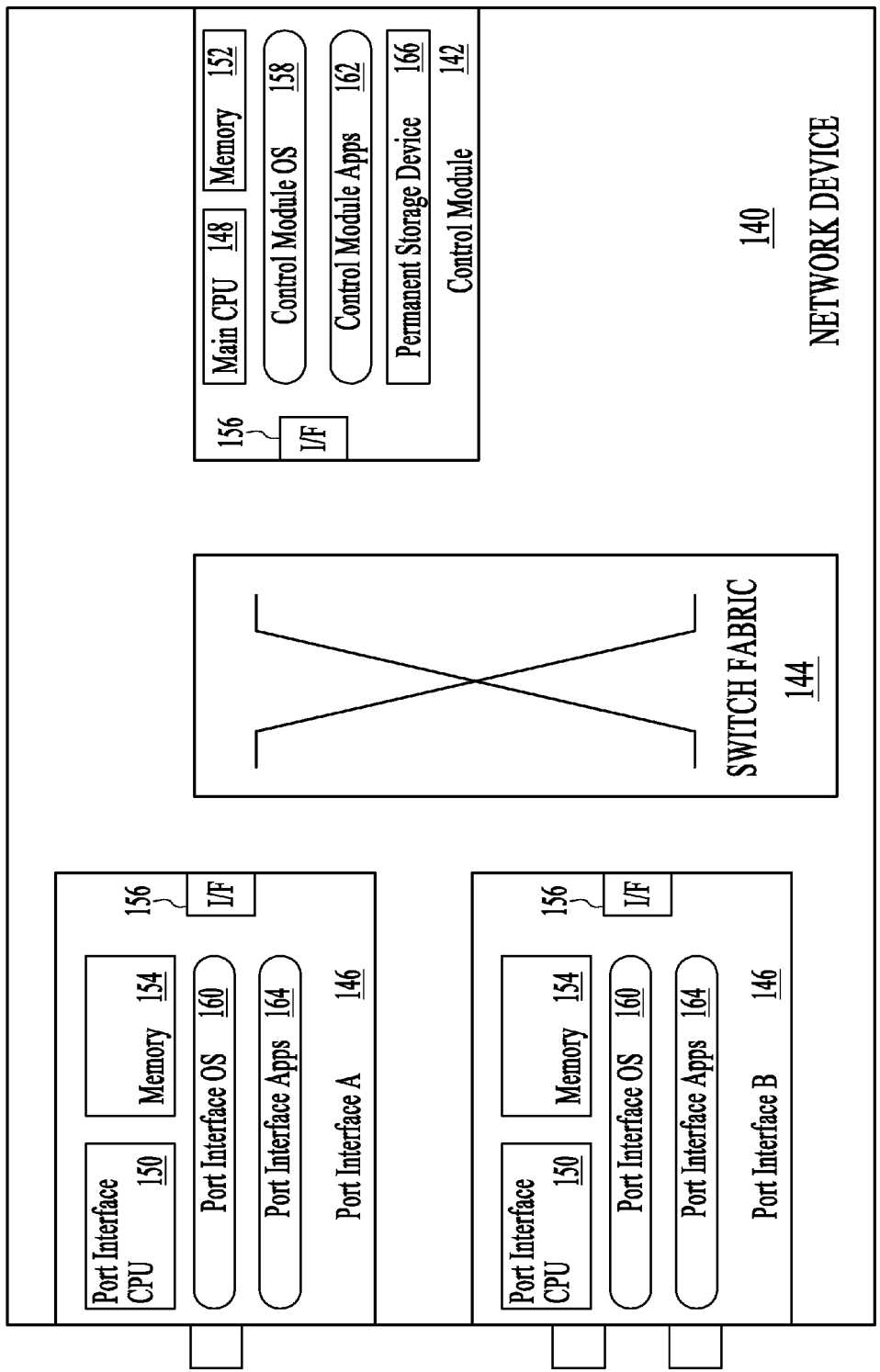
FIG. 3 depicts an exemplary network switching and/or routing device that can function as a PE device and/or a PBB device.

FIG. 3 depicts an exemplary network switching and/or routing device (referred to herein as a network node 140) that includes a control module 142, a switch fabric 144, and two port interface modules 146 (port interfaces A and B). The network node is described as having a distributed architecture because the control module and the two port interfaces each run their own independent operating systems.

The network node 140 handles traffic in discrete segments, often referred to as datagrams. In an embodiment, the network node is an Ethernet switch/router that forwards traffic within the network node using Layer 2 (L2), Layer 3 (L3), and/or Layer 4 (L4) header information, where the network "Layers" are described in the Open System Interconnection (OSI) model as defined by the International Standardization Organization (ISO). The network node may include port interfaces that support network protocols such as Ethernet, asynchronous transfer mode (ATM), synchronous optical network (SONET), and Frame Relay. Although an Ethernet-based switch/router is described, the disclosed techniques for operating a network can be applied to other types of network nodes.

Referring to FIG. 3, the control module 142 of the network node 140 supports various functions such as network management functions and protocol implementation functions. Example functions that are performed by the control module include implementing configuration commands, providing timing control, distributing operating system and application software code, programming hardware tables, providing system information, supporting a user interface, managing hardware changes, and bus management. The switch fabric 144 provides datapaths between the control module and the port interfaces 146 (e.g., control module to port interface datapaths and port interface to port interface datapaths). The switch fabric may include, for example, shared memory, shared bus, and crosspoint matrices. The port interfaces perform functions such as receiving traffic into the network node, buffering traffic, making forwarding decisions, and transmitting traffic from the network node. The port interfaces include one or more ports that support connections to other network nodes.

The control module 142 and port interfaces 146 are independent computer systems that include their own central processing unit (CPU) 148 and 150, memory 152 and 154, interface (I/F) 156, operating system 158 and 160, and applications 162 and 164. The CPU within each independent computer system may include a multifunction processor and/or an application-specific processor. Examples of processors include the PowerPC™ family of processors by IBM and the x86 family of processors by Intel. The memory within the control module may include read only memory (ROM), flash memory, and RAM. The control module includes a large capacity permanent storage device such as a hard disk drive. Because the port interfaces do not include a permanent storage device similar to the control module, their storage capacity is much less than that of the control module.

The interfaces 156 of the control module 142 and port interfaces 146 enable the control module and port interfaces to communicate with each other. In an embodiment, the control module and port interfaces communicate with each other over a backplane (not shown).

The operating systems 158 and 160 of the control module 142 and port interfaces 146 provide a bridge between the CPU, memory, and applications of the respective modules. Examples of operating systems that are used in network nodes with distributed architectures include well-known operating systems such as NetBSD, Linux, and vxWORKS. Although not shown, the CPUs and operating systems may be supported by other hardware (e.g., content addressable memory (CAM) and application-specific integrated circuits (ASICs)).

The applications 162 and 164 that reside on the independent computer systems (i.e., the control module 142 and port interfaces 146) are software-based applications that perform various tasks required of the network node 140. In an embodiment, one of the applications residing on the network node includes an application to implement the above-described technique for providing failure protection in a PBB network using selective redirection. Other exemplary applications that are loaded onto the independent computer systems of the network node include, but are not limited to, L2 protocols, such as L2 Learning, virtual local area network (VLAN) management, spanning tree protocol (STP), and link aggregation control protocol (LACP) and L3 protocols such as open shortest path first (OSPF), border gateway protocol (BGP), intermediate system-to-intermediate system (ISIS), and multiprotocol label switching (MPLS). Although the CPUs 148 and 150, memory 152 and 154, operating systems 158 and 160, and applications 162 and 164 of each module are depicted in FIG. 2 as separate functional units for description purposes, these functional units are operatively and functionally integrated as is known in the field. Additionally, although some examples of CPUs, memory, operating systems, and applications are provided, these examples in no way are meant to be exhaustive lists. In an embodiment, the network node of FIG. 2 is a chassis-based network node in which the control module, switch fabric, and port interfaces are individually removable modules.

While the above-described techniques are described in the general context of network devices such as Ethernet-based switches, bridges, etc., those skilled in the art will recognize that the above-described techniques may be implemented in software, hardware, firmware or any combination thereof. The above-described embodiments of the invention may also be implemented, for example, by operating a computer system to execute a sequence of machine-readable instructions. The instructions may reside in various types of computer readable media. In this respect, another embodiment of the invention involves a programmed product, comprising computer readable media tangibly embodying a program of machine readable instructions executable by a digital data processor to perform the above-described method. The computer readable media may comprise, for example, RAM (not shown) contained within the PE devices. Alternatively, the instructions may be contained in another computer readable media such as a magnetic data storage diskette and directly or indirectly accessed by a computer system. Whether contained in the computer system or elsewhere, the instructions may be stored on a variety of machine readable storage media, such as a DASD storage (e.g. a conventional "hard drive" or a RAID array), magnetic tape, electronic read-only memory, an optical storage device (e.g., CD ROM, WORM, DVD, digital optical tape), paper "punch" cards, or other suitable computer readable media including transmission media such as digital, analog, and wireless communication links. In an illustrative embodiment of the invention, the machine-readable instructions may comprise lines of compiled C, C++, or similar language code commonly used by those skilled in the programming for this type of application arts.

Although specific embodiments of the invention have been described and illustrated, the invention is not to be limited to the specific forms or arrangements of parts as described and illustrated herein. The invention is limited only by the claims.

What is claimed is:

1. A method for operating a network that utilizes provider backbone bridging (PBB) according to IEEE 802.1 ah to create a PBB domain, wherein the network includes a first customer edge (CE) device connected to first and second PBB provider edge (PE) devices such that the first CE device is dual-homed to the first and second PBB PE devices and a second CE device connected to a third PBB PE device, the method comprising:
creating a backup link between the first and second PBB PE devices, the backup link identifying customer MAC addresses (CMACs) for which unicast Ethernet traffic can be redirected from the first PBB PE device to the second PBB PE device;
detecting a service failure that requires a path change for customer Ethernet traffic to reach the first CE device from the second CE device;
selectively redirecting only unicast Ethernet traffic, which is destined to the first CE device, from the first PBB PE device to the second PBB PE device via the backup link in response to the detected service failure;
preventing multicast Ethernet traffic and broadcast Ethernet traffic from being redirected from the first PBB device to the second PBB PE device; and
preventing the second PBB PE device from performing MAC learning on the redirected unicast Ethernet traffic.

2. The method of claim 1 wherein unicast Ethernet traffic is redirected for a limited pre-defined interval.

3. The method of claim 2 further comprising learning, at the third PBB PE device, CMAC-to-BMAC associations that map a CMAC from a customer domain to a BMAC of the first PBB PE device, wherein the limited pre-defined interval is a time interval that is longer than an aging time interval of the CMAC-to-BMAC associations at the third PBB PE.

4. The method of claim 1 further comprising, at the third PBB PE device, learning a new CMAC-to-BMAC association that maps the CMAC to the BMAC of the second PBB PE device.

5. The method of claim 4 further comprising sending unicast Ethernet traffic from the second CE device to the first CE device via the second PBB PE device according to the newly learned CMAC-to-BMAC association.

6. The method of claim 1 wherein selectively redirecting unicast Ethernet traffic comprises redirecting only known unicast Ethernet traffic that is associated with the backup link.

7. The method of claim 1 further comprising, at the second PBB PE device, flooding the redirected unicast Ethernet traffic only in customer domains corresponding to the redirected unicast Ethernet traffic.

8. The method of claim 1 further comprising preventing the second PBB PE device from forwarding the unicast Ethernet traffic towards the PBB domain.

9. A network device for use in a network that utilizes provider backbone bridging (PBB) according to IEEE 802.1 ah to create a PBB domain, wherein the network includes a first customer edge (CE) device connected to first and second PBB provider edge (PE) devices such that the first CE device is dual-homed to the first and second PBB PE devices and a second CE device connected to a third PBB PE device, the network device comprising:
means for creating a backup link between the first and second PBB PE devices, the backup link identifying customer MAC addresses (CMACs) for which unicast Ethernet traffic can be redirected from the first PBB PE device to the second PBB PE device;

means for detecting a service failure that requires a path change for customer Ethernet traffic to reach the first CE device from the second CE device;

means for selectively redirecting only unicast Ethernet traffic, which is destined to the first CE device, from the first PBB PE device to the second PBB PE device via the backup link in response to the detected service failure;

means for preventing multicast Ethernet traffic and broadcast Ethernet traffic from being redirected from the first PBB device to the second PBB PE device; and means for preventing the second PBB PE device from performing MAC learning on the redirected unicast Ethernet traffic.

10. The network device of claim 9 wherein unicast Ethernet traffic is redirected for a limited pre-defined interval.

11. The network device of claim 10 wherein the limited pre-defined interval is a time interval that is longer than an aging time interval of CMAC-to-BMAC associations at the third PBB PE.

12. The network device of claim 9 wherein creating the backup link comprises identifying CMACs that are reachable from the second PBB PE device.

13. The network device of claim 9 wherein selectively redirecting Ethernet unicast traffic comprises redirecting only known unicast traffic that is associated with the backup link.

14. A method for operating a network that utilizes provider backbone bridging (PBB) according to IEEE 802.1ah to create a PBB domain, wherein the network includes a first customer edge (CE) device connected to first and second PBB provider edge (PE) devices such that the first CE device is dual-homed to the first and second PBB PE devices and a second CE device connected to a third PBB PE device, the method comprising:

at the third PBB PE device, learning a CMAC-to-BMAC association that maps a customer MAC (CMAC) from a customer domain to a backbone MAC of the first PBB PE device;

sending unicast Ethernet traffic from the second CE device to the first CE device via the first PBB PE device according to the CMAC-to-BMAC association;

detecting a service failure that requires a path change for customer Ethernet traffic to reach the first CE device from the second CE device;

selectively redirecting only unicast Ethernet traffic, which is destined to the first CE device, from the first PBB PE device to the second PBB PE device via the backup link in response to the detected service failure and preventing multicast Ethernet traffic and broadcast Ethernet traffic from being redirected from the first PBB device to the second PBB PE device;

at the second PBB PE device, preventing the second PBB PE device from performing MAC learning on the redirected unicast Ethernet traffic;

at the third PBB PE device, learning a new CMAC-to-BMAC association that maps the CMAC to the BMAC of the second PBB PE device; and sending unicast Ethernet traffic from the second CE device to the first CE device via the second PBB PE device according to the newly learned CMAC-to-BMAC association.

15. The method of claim 14 wherein selectively redirecting unicast Ethernet traffic comprises creating the backup link between the first and second PBB PE devices, the backup link identifying customer MAC addresses (CMACs) for which unicast Ethernet traffic can be redirected from the first PBB PE device to the second PBB PE device.

16. The method of claim 15 wherein unicast Ethernet traffic is redirected for a limited pre-defined interval.

17. The method of claim 16 wherein the limited pre-defined interval is a time interval that is longer than an aging time interval of the CMAC-to-BMAC associations at the third PBB PE.

\* \* \* \* \*